(12) United States Patent  
Lunawat et al.

(10) Patent No.: US 8,799,894 B2  
(45) Date of Patent: Aug. 5, 2014

(54) END-TO-END MAPPING FROM OPERATING SYSTEM RUNNING ON VIRTUAL MACHINE TO STORAGE VOLUME OF STORAGE-ARRAY NETWORK (SAN)

(75) Inventors: Ajay Lunawat, San Jose, CA (US); Martin Eggers, Mainz (DE); Patrick Schaefer, Hargesheim (DE); Viroel Ciurea, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 12/428,328

(22) Filed: Apr. 22, 2009

(65) Prior Publication Data

US 2010/0275201 A1 Oct. 28, 2010

(51) Int. Cl.
*G06F 9/455* (2006.01)
*G06F 9/46* (2006.01)
*G06F 9/50* (2006.01)

(52) U.S. Cl.
CPC ............................ *G06F 9/5077* (2013.01); *G06F 9/455* (2013.01)
USPC ............................................. 718/1; 718/104

(58) Field of Classification Search
CPC ...................... G06F 9/455; G06F 9/5077
USPC .................................................... 718/1, 104
See application file for complete search history.

(56) References Cited

U.S. PATENT DOCUMENTS

| | | | | |
|---|---|---|---|---|
| 7,577,722 | B1 * | 8/2009 | Khandekar et al. | 709/220 |
| 2008/0134175 | A1 | 6/2008 | Fitzgerald | |
| 2008/0155169 | A1 | 6/2008 | Hiltgen | |
| 2008/0155223 | A1 | 6/2008 | Hiltgen | |
| 2008/0155243 | A1 * | 6/2008 | Diep et al. | 713/2 |
| 2008/0189468 | A1 | 8/2008 | Schmidt | |
| 2008/0244577 | A1 * | 10/2008 | Le et al. | 718/1 |
| 2008/0288627 | A1 | 11/2008 | Hubis | 709/223 |
| 2009/0083445 | A1 * | 3/2009 | Ganga | 709/250 |
| 2010/0223613 | A1 * | 9/2010 | Schneider | 718/1 |
| 2010/0257326 | A1 * | 10/2010 | Otani et al. | 711/162 |

* cited by examiner

*Primary Examiner* — Abdullah Al Kawsar
*Assistant Examiner* — Blake Kumabe
(74) *Attorney, Agent, or Firm* — Feb Cabrasawan (57) ABSTRACT

An end-to-end mapping from a file system of an operating system running on a virtual machine to a storage volume of a SAN is determined. The virtual machine reported by the operating system is mapped to a definition of the virtual machine as provided by a management component managing the virtual machine. A storage device reported by the operating system is mapped to a definition of a virtual storage device as provided by the management component, such as by using a SCSI controller number and target identifier of the virtual machine storage device to correlate the virtual machine storage device to the definition. The definition of the virtual storage device is mapped to a storage device on a physical computing device on which the management component and the virtual machine are running. The storage device on the physical computing device is mapped to the storage volume of the SAN.

34 Claims, 5 Drawing Sheets

END-TO-END MAPPING FROM OPERATING SYSTEM RUNNING ON VIRTUAL MACHINE TO STORAGE VOLUME OF STORAGE-ARRAY NETWORK (SAN)

FIELD OF THE INVENTION

The present invention relates generally to a virtual machine having a storage device physically implemented by a storage volume of a storage-array or storage-area network (SAN). The present invention relates more particularly to determining an end-to-end mapping from an operating system running on such a virtual machine to the storage volume of the SAN physically implementing the storage device of the virtual machine.

BACKGROUND OF THE INVENTION

Historically, a single computing device ran a single operating system. Each computer user, for instance, was assigned his or her own client computing device, and that computing device ran an operating system in which the user could run application programs as desired. Similarly, a server computing device ran a single operating system that ran application programs.

However, this type of computer architecture has disadvantages. First, it is costly, because each computing device needs a complete assortment of processors, memory, and input/output (I/O) devices to properly function whether it is being utilized or not. Second, the use of this type of architecture can be inefficient. At any given time, a given computing device may not be performing work, and rather is sitting idle, waiting for a task to be performed during times when workloads increase.

Therefore, a technology has been developed in which more than one operating system is capable of running on a single computing device, sharing at least the memory and the processors of the computing device. Such technology is referred to as virtualization. With virtualization, a given computing device has a number of virtual machines, where an operating system is run in each virtual machine. Therefore, operating systems for multiple computer users can be run simultaneously on a single computing device, such as a single server computing device. When workload demands are high, more virtual machines can be instantiated and run. When workloads are low, virtual machines can be suspended.

As such, periodically, maintenance and management of the virtual machines may have to be performed. As one example, a virtual machine may have to be migrated from one server computing device, or server, to another server computing device, or server. For instance, the server that is currently hosting the virtual machine may need to be serviced, such that the virtual machine has to be migrated to another server while the service or maintenance is being performed. Improving the ability of a user such as an administrator to maintain and manage virtual machines in this and other ways is advantageous, because it makes the administrator's job easier, and can enhance the business case for adopting virtual machines within organizational environments like corporate environments.

SUMMARY OF THE INVENTION

The present invention relates to determining an end-to-end mapping from an operating system running on a virtual machine to a storage volume of a storage-array or storage-area network (SAN). A method of one embodiment of the invention determines such an end-to-end mapping as follows. The method maps a virtual machine as reported by an operating system running on the virtual machine to a definition of the virtual machine as provided by a management component that manages the virtual machine. The method maps a storage device as reported by the operating system running on the virtual machine to a definition of a virtual storage device as provided by the management component managing the virtual machine.

This mapping is achieved by using a storage interface controller number, such as a small computer system interface (SCSI) controller number, and a storage interface target identifier (ID), such as a SCSI target ID, of the virtual storage device to correlate the storage device as reported by the operating system to the definition of the virtual storage device as provided by the management component. The definition of the virtual storage device is itself mapped to a storage device on a physical computing device on which the management component and the virtual machine are running. The storage device on the physical computing device is then mapped to a storage volume of a SAN. The storage interface controller number and the storage interface target ID are normally dynamic.

A method of another embodiment of the invention determines an end-to-end mapping from a file system of an operating system running on a virtual machine to a storage volume of a SAN as follows. A virtual machine file system portion of the end-to-end mapping is determined. The virtual machine file system portion includes identification of the file system of the operating system running on the virtual machine. A virtual machine storage device portion of the end-to-end mapping and a virtual machine storage device definition portion of the end-to-end mapping are determined. The virtual machine storage device portion includes identification of a virtual machine storage device defined within the file system of the operating system running on the virtual machine. The virtual machine storage device definition portion includes a definition of the virtual machine storage device as provided by a management component managing the virtual machine.

The method further determines a physical computing device file system portion of the end-to-end mapping and a physical computing device storage device portion of the end-to-end mapping. The physical computing device file system portion includes a file system of a physical computing device on which the virtual machine is running. The physical computing device storage device portion includes identification of a storage device defined within the file system of the physical computing device on which the virtual machine is running. The method also determines a SAN storage volume portion of the end-to-end mapping. The SAN storage volume portion includes identification of a storage volume of a SAN that implements the storage device defined within the file system of the physical computing device on which the virtual machine is running.

The method determines the virtual machine storage device portion and the virtual machine storage device definition portion of the end-to-end mapping by mapping a storage device as reported by the operating system running on the virtual machine to a definition of a virtual storage device as provided by the management component. Furthermore, the method maps the storage device as reported by the operating system running on the virtual machine to the definition of the virtual storage device as provided by the management component by using a storage interface controller number, such as a small computer system interface (SCSI) controller number, and a storage interface target identifier (ID), such as a SCSI ID, of the virtual storage device. Such usage correlates the storage device as reported by the operating system to the definition of the virtual storage device as provided by the management component. The storage interface controller number and the storage interface target ID are normally dynamic.

A computer-readable medium of an embodiment of the invention has one or more computer programs stored thereon for execution by one or more processors. Execution of the computer programs by the processors results in performance of a method for determining an end-to-end mapping from an operating system running on a virtual machine to a storage volume of a SAN. The method maps a storage device as reported by the operating system running on the virtual machine to a definition of a virtual storage device as provided by the management component managing the virtual machine. This mapping is achieved by using a small computer system interface (SCSI) controller number and a SCSI target identifier (ID) of the virtual storage device to correlate the storage device as reported by the operating system to the definition of the virtual storage device as provided by the management component.

A system of an embodiment of the invention includes a physical computing device, a SAN, a virtual machine, a management component, and a mechanism. The physical computing device has a file system that defines a storage device. The SAN has a SAN storage volume to physically implement the storage device defined by the file system of the physical computing device. The virtual machine runs on the physical computing device, and has an operating system and a virtual machine file system. The virtual machine file system has a virtual machine storage device. The virtual machine storage device is implemented by the storage device defined by the file system of the physical computing device. The management component runs on the physical computing device to manage the virtual machine, and maintains a virtual machine storage device definition of the virtual machine storage device. The mechanism determines an end-to-end mapping from the file system of the operating system running on the virtual machine to the SAN storage volume of the SAN.

A system of an embodiment of the invention includes a physical computing device, a SAN, a virtual machine, a management component, and a means. The physical computing device has a file system that defines a storage device. The SAN has a SAN storage volume to physically implement the storage device defined by the file system of the physical computing device. The virtual machine runs on the physical computing device, and has an operating system and a virtual machine file system. The virtual machine file system has a virtual machine storage device. The virtual machine storage device is implemented by the storage device defined by the file system of the physical computing device. The management component runs on the physical computing device to manage the virtual machine, and maintains a virtual machine storage device definition of the virtual machine storage device. The means is for determining an end-to-end mapping from the file system of the operating system running on the virtual machine to the SAN storage volume of the SAN.

Still other aspects and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Maintenance and management of a virtual machine that has its (virtual) storage device physically implemented by a storage volume of a SAN are more easily provided by utilizing embodiments of the present invention. This is because embodiments of the invention determine an end-to-end mapping from the file system of the operating system running on the virtual machine all the way to the storage volume of the SAN. As such, for example, a network administrator can easily view how a virtual machine is implemented, all the way the file system of the operating system of the virtual machine to the actual storage volume of the SAN that physically implements the (virtual) storage device of the virtual machine.

The mapping determined by embodiments of the invention thus recites how each virtual or physical component of a virtual machine configuration is implemented. The mapping is considered an end-to-end mapping in that the entirety of the configuration is specified, from one end of the configuration (i.e., the file system of the operating system of the virtual machine) to the other end (i.e., the storage volume of the SAN) of the configuration. If a network administrator is contemplating changes to a virtual machine configuration, he or she will thus be able to understand how such changes will affect the configuration, insofar as the administrator has knowledge of how the entire configuration is mapped from end-to-end.

Representative System and Overview

Figure 1:
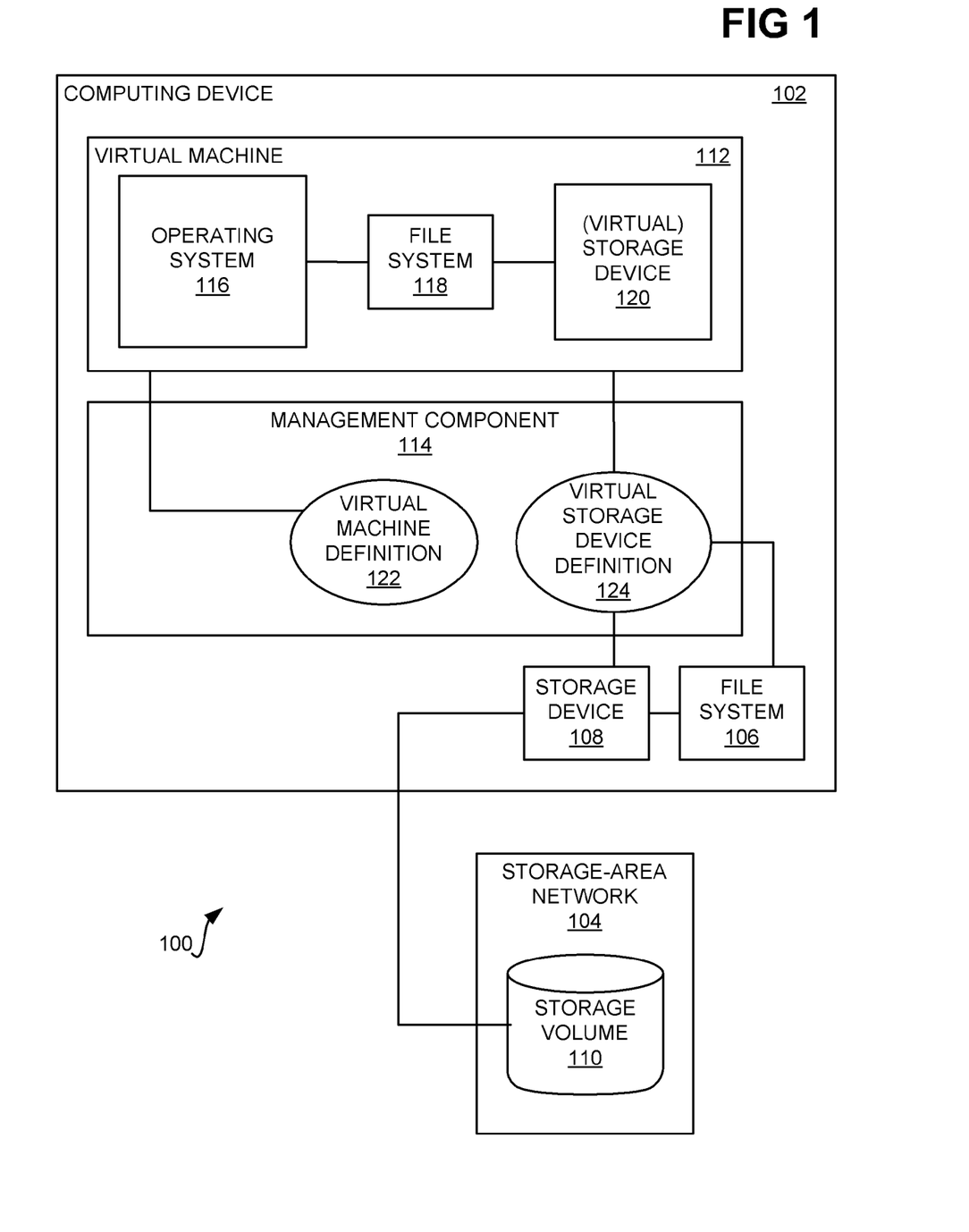
FIG. 1 is a diagram of a representative system in relation to which an end-to-end mapping from a file system of an operating system running on a storage volume of a storage-array or storage-area network (SAN) can be determined, according to an embodiment of the present invention.

FIG. 1 shows a representative system 100, according to an embodiment of the invention. The system 100 includes a computing device 102 and a storage-area or storage-array network (SAN) 104. The computing device 102 may be a server computing device, or server, and typically includes processors, volatile memory like semiconductor memory, non-volatile storage devices like hard disk drives, and other types of hardware. The SAN 104 is a special type of network, specifically a network of storage devices, such as a network of hard disk drives. In large enterprise environments, a SAN like the SAN 104 connects multiple servers, such as the computing device 102, to a centralized pool of storage devices, such as the storage volume 110.

The computing device 102 has a native file system 106 that supports or defines storage devices like the storage device 108. The file system 106 specifies the approach that the computing device 102 employs for storing and retrieving files on the storage device 108. The file system 106 is specifically the system software that receives commands from an operating system to read and write disk clusters, or groups of sectors, on the storage device 108. The file system 106 manages a folder or directory structure, which provides an index to the files, and it defines the syntax used to access them, such as the how the path to a file is coded. The file system 106 can dictate how files are named as well as the maximum size of a file or volume. Examples of file systems include the extended-2 (ext2) and the extended-3 (ext3) file systems, which are typically used in conjunction with versions of the LINUX® operating system. Further examples of file systems include the UNIX® file system (UFS) and the z-Series file system (ZFS), which are typically used in conjunction with versions of the UNIX® operating system.

The storage device 108 of the file system 106 in the system 100 is particularly implemented by the storage volume 110 of the SAN 104. In this sense, the storage device 108 of the computing device 102 is not an actual physical storage device residing within the computing device 102, but rather refers to an actual physical storage device represented by the storage volume 110 of the SAN 104. The storage volume 110 of the SAN 104 may be a single physical storage device, such as a single hard disk drive, or it may be implemented over a number of physical storage devices of the SAN 104. However, from the perspective of the file system 106, the storage device 108 is used within the computing device 102 as if it were a physical storage device.

The computing device 102 supports a number of virtual machines, such as the virtual machine 112, which are managed by a management component 114, which may also be referred to as a hypervisor or a virtual machine monitor (VMM). The virtual machine 112 includes an instance of an operating system 116, along with one or more applications, running in an isolated partition within the computing device 102. Using virtual machines enables different operating systems to run on the same computing device 102 at the same time while preventing applications running on separate virtual machines from interfering with each other.

Each virtual machine running on the computing device 102 is effectively a "machine within the machine" and functions as if it had exclusive access to the hardware resources of the computing device 102. The operating system 116 running on the virtual machine 112 is referred to as a "guest operating system," and the operating system 116 communicates with the hardware of the computing device 102 via the management component 114. The management component 114 thus "virtualizes" the hardware of the computing device 102 for each virtual machine running on the computing device 102.

The operating system 116 running on the virtual machine 112 may have a corresponding file system 118, which can be a different type of file system than the file system 106 of the computing device 102 as a whole. Where present, the file system 118 supports or defines a (virtual) storage device 120. The storage device 120 can be considered as a part of the file system 118 to some degree. The storage device 120 is virtual in the sense that it is implemented within a virtual machine 112, and does not represent an actual physical storage device. However, the operating system 116 accesses the storage device 120, via the file system 118, as if the storage device 120 were an actual physical storage device. Thus, all of the components of the virtual machine 112, including the operating system 116, the file system 118, and the storage device 120, are virtual at least in the sense that they are operating as part of the virtual machine 112.

The management component 114 is implemented in software, hardware, or a combination of software and hardware, and runs on the computing device 102 to manage the virtual machine 112. Examples of software that provides for the management component 114 and thus provides for the instantiation of virtual machines such as the virtual machine 112 include VMware® virtual machine software, including VMware® ESX Server virtual machine software, available from VMware, Inc., of Palo Alto, Calif. The management component 114 maintains a virtual machine definition 122, which defines the virtual machine 112. The virtual machine definition 122 indicates, for instance, the type of operating system 116 and the type of file system 118 running on the virtual machine 112.

Similarly, the management component 114 maintains a virtual storage device definition 124, which defines the storage device 120 of the virtual machine 112. The virtual storage device definition 124 defines which storage device of the computing device 102, through the file system 106, implements the storage device 120 of the virtual machine 112. For example, in FIG. 1, the virtual storage device definition 124 indicates that the storage device 120 is implemented by the storage device 108 via the file system 106, where the storage device 108 is in turn itself implemented by the storage volume 110 of the SAN 104.

It is noted that the storage volume 110 is assigned to the physical computing device 102, and not directly to the virtual machine 112. As such, the mapping between the virtual machine 112 to the storage volume 110 may not be a one-to-one mapping, since more than one virtual machine may be assigned to the storage volume 110. However, for descriptive clarity, just one virtual machine 112 is described herein as having a (virtual) storage device 120 that is ultimately implemented by the storage volume 110 of the SAN 104.

Figure 2:
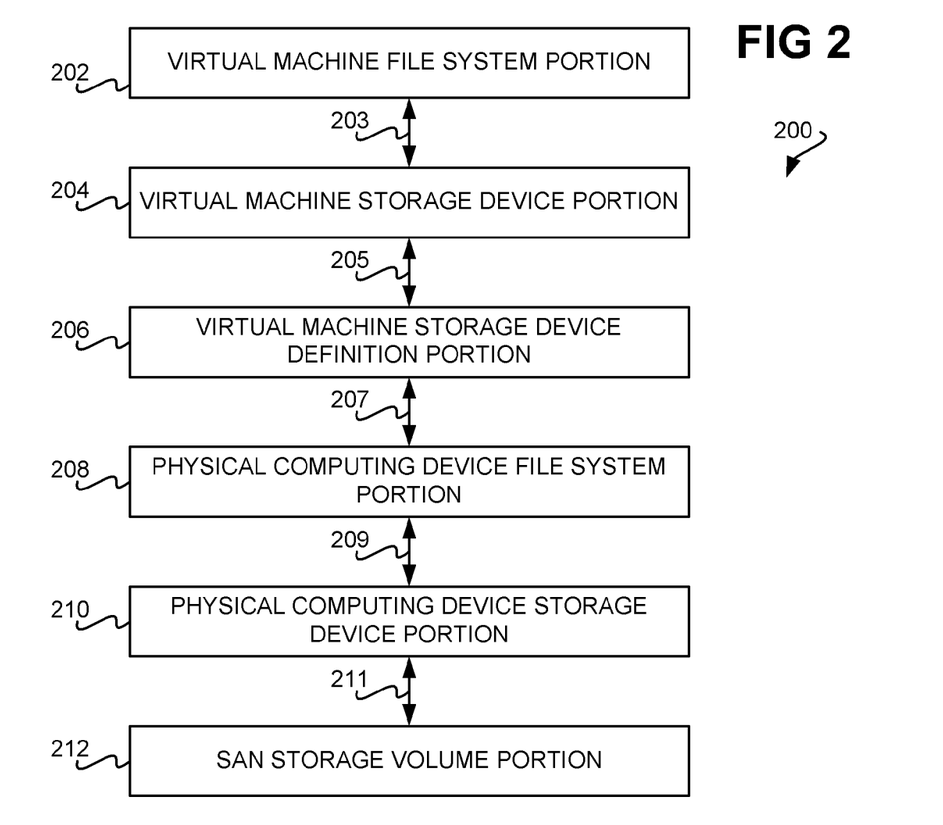
FIG. 2 is a diagram of an end-to-end mapping from a file system of an operating system running on a virtual machine to a SAN storage volume, according to an embodiment of the present invention.

To permit a network administrator or other user to properly manage the virtual machine 112 via the management component 114, embodiments of the invention determine an end-to-end mapping from the file system 118 of the operating system 116 running on the virtual machine 112, to the storage volume 110 of the SAN 104 that implements the storage device 108 on which the storage device 120 is implemented. FIG. 2 shows an example of such an end-to-end mapping 200, according to an embodiment of the invention. The end-to-end mapping 200 includes, in order: a virtual machine file system portion 202, a virtual machine storage device portion 204, a virtual machine storage device definition portion 206, a physical computing device file system portion 208, a physical computing device storage device portion 210, and a SAN storage volume portion 212.

In the context of FIG. 1, the virtual machine file system portion 202 identifies the file system 118 of the virtual machine 112 running on the computing device 102. The virtual machine file system portion 202 is linked or mapped to the virtual machine storage device portion 204, as indicated by the bi-directional arrow 203. In the context of FIG. 1, the virtual machine storage device portion 204 identifies the storage device 120 of the virtual machine 112. The virtual machine storage device portion 204 is linked or mapped to the virtual machine storage device definition portion 206, as indicated by the bi-directional arrow 205. In the context of FIG. 1, the virtual machine storage device definition portion 206 identifies the virtual storage device definition 124 maintained by the management component 114.

The virtual machine storage device definition portion 206 is linked or mapped to the physical computing device file system portion 208, as indicated by the bi-directional arrow 207. In the context of FIG. 1, the physical computing device file system portion 208 identifies the file system 106 of the computing device 102. The physical computing device file system portion 208 is linked or mapped to the physical computing device storage device portion 210, as indicated by the bi-directional arrow 209. In the context of FIG. 1, the physical computing device storage device portion 210 identifies the storage device 108 of the computing device 102. The physical computing device storage device portion 210 is linked or mapped to the SAN storage volume portion 212, as indicated by the bi-directional arrow 209. In the context of FIG. 1, the SAN storage volume portion 212 identifies the storage volume 110 of the SAN 104.

Determining the end-to-end mapping 200 permits a network administrator or other user to discern in detail how the virtual machine 112 is related to the SAN 104 of FIG. 1 in detail. Each mapping from the components of the virtual machine 112 through components of the SAN 104 is clearly provided within the end-to-end mapping 200. As such, for example, a user wishing to modify the storage device 108 of the computing device 102 will know a priori that such modification affects the virtual machine 112 as end-to-end mapped to the SAN 104. This is because the end-to-end mapping 200 denotes that the storage device 120 of the virtual machine 112 is ultimately implemented by the storage volume 110 of the SAN 104 via the storage device 108.

Figure 3:
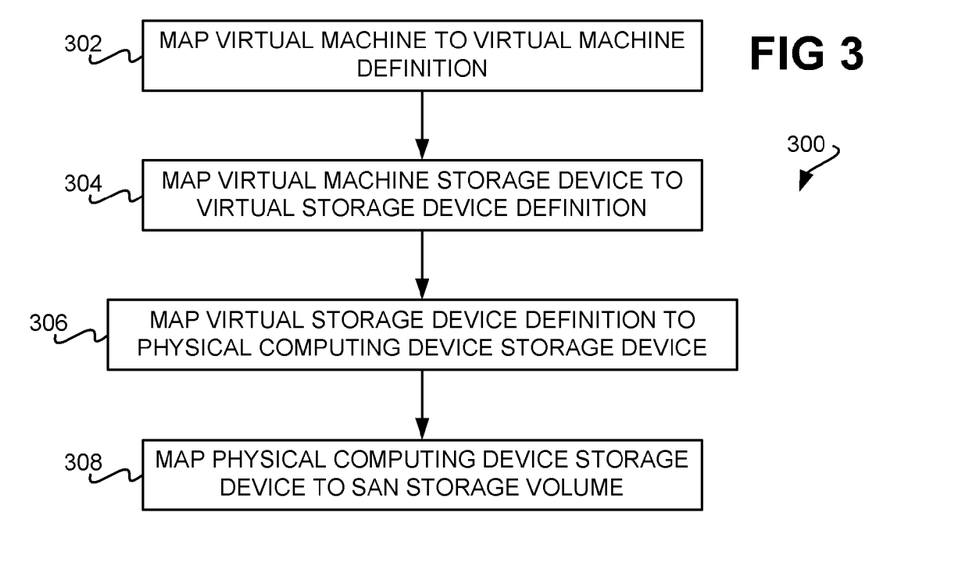
FIG. 3 is a flowchart of a general method for determining the end-to-end mapping of FIG. 2, according to an embodiment of the present invention.

FIG. 3 shows a general method 300 for determining the end-to-end mapping 200 of FIG. 2, according to an embodiment of the invention. As with other methods of embodiments of the invention, the method 300 can be implemented by one or more computer programs stored on a computer-readable medium, such as a tangible computer-readable medium like a recordable data storage medium. The computer programs are executed by one or more processors, such as by one or more processors of one or more computing devices. Execution of the computer programs by the processors results in the method 300 being performed.

The method 300 maps the virtual machine 112 as reported by the operating system 116 running on the virtual machine 112 to the virtual machine definition 122 provided by the management component 114 managing the virtual machine 112 of FIG. 1 (302). Determining this mapping effectively provides the virtual machine file system portion 202 of the end-to-end mapping 200 of FIG. 2. This is because the reporting of the virtual machine 112 by the operating system 116 can include identification of the file system 118 to which the virtual machine file system portion 202 corresponds. Alternatively, this is because the virtual machine definition 122 provided by the management component 114 managing the virtual machine 112 can include identification of the file system 118 to which the virtual machine file system portion 202 corresponds.

The method 300 maps the storage device 120 as reported by the operating system 116 running on the virtual machine 112 to the virtual storage device definition 124 provided by the management component 114 managing the virtual machine 112 of FIG. 1 (304). Determining this mapping effectively provides the virtual machine storage device portion 204 and the virtual machine storage device definition portion 206 of the end-to-end mapping 200 of FIG. 2. This is because the storage device 120 reported by the operating system 116 corresponds to the virtual machine storage device portion 204, and the virtual storage device definition 124 provided by the management component 114 corresponds to the virtual machine storage device definition portion 206.

The method 300 maps the virtual storage device definition 124 provided by the management component 114 managing the virtual machine 112 to the storage device 108 of the physical computing device 102 on which the management component 114 and the virtual machine 112 are running in FIG. 1 (306). Determining this mapping effectively provides the physical computing device file system portion 208 and the physical computing device storage device portion 210 of the end-to-end mapping 200 of FIG. 2. As to the latter, the storage device 108 of the computing device 102 corresponds to the physical computing device storage device portion 210, such that identifying the storage device 108 provides the physical computing device storage device portion 210. As to the former, because the file system 106 specifies the approach used to retrieve and store files on the storage device 108, and because the file system 106 supports the storage device 108, identifying the storage device 108 at least implicitly identifies the file system 106 that corresponds to the physical computing device file system portion 208.

The method 300 finally maps the storage device 108 of the physical computing device 102 on which the management component 114 and the virtual machine 112 are running to the storage volume 110 of the SAN 104 of FIG. 1 (308). Determining this mapping provides the SAN storage volume portion 212 of the end-to-end mapping 200 of FIG. 2. This is because the SAN storage volume 110 corresponds to the SAN storage volume portion 212 of the end-to-end mapping 200.

In the next section of the detailed description, a method for determining the end-to-end mapping 200 of FIG. 2 is presented and described that is more detailed than but consistent with the method 300 of FIG. 3. This method is described in sufficient detail to enable one of ordinary skill within the art to make and use the invention. However, those of ordinary skill within the art can appreciate that deviations from the method can be made while still practicing the invention itself, which is defined only by the claims.

Detailed Method to Determine End-to-End Mapping

Figure 4:
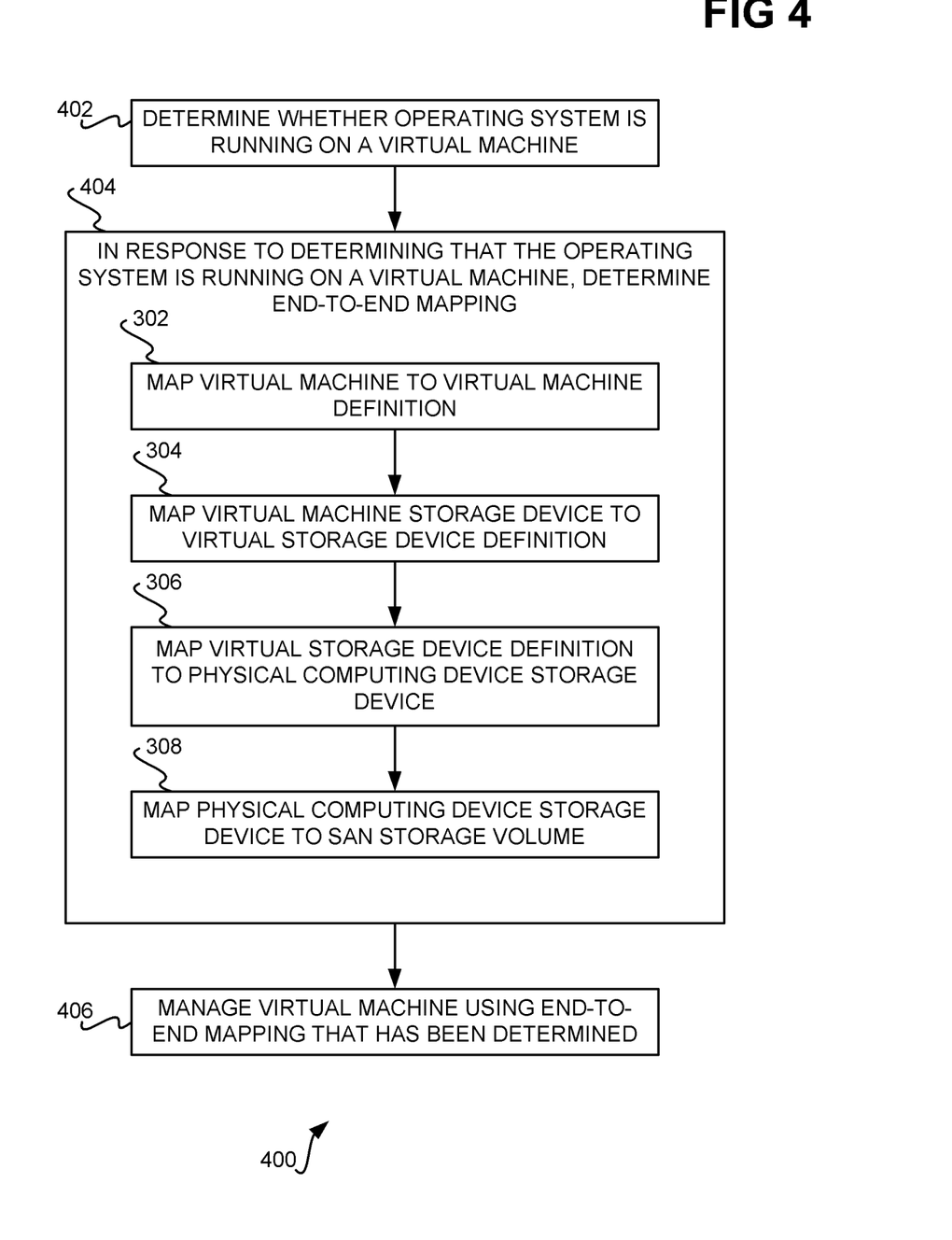
FIG. 4 is a flowchart of a method for determining the end-to-end mapping of FIG. 2, according to another embodiment of the present invention.

FIG. 4 shows a method 400 to determine the end-to-end mapping 200 of FIG. 2, according to another embodiment of the invention. The method 400 is described in the context of the system 100 of FIG. 1. The method 400 first determines whether the operating system 116 of FIG. 1 is running on a virtual machine (402). In one embodiment, part 402 is performed by first determining a media-access control (MAC) address of a network controller, such as a network card, of the machine on which the operating system 116 is running, where the machine is not a priori known to be a virtual machine or a physical machine. As such, it is not a priori known whether the network controller itself is a virtual network controller or a physical network controller. The MAC address of a network controller is a serial number that uniquely identifies the network controller, and thus typically the machine of which it is a part, on a network.

Hereafter, the terminology "MAC address of the machine" is used as shorthand to mean "MAC address of a network controller of the machine," as those of ordinary skill within the art can appreciate. It is therefore determined whether the MAC address of the machine on which the operating system 116 of FIG. 1 is running falls within a range of MAC addresses assigned by the management component 114 to virtual machines. If the MAC address of the machine on which the operating system 116 is running falls within this range of MAC addresses, then the method 400 in part 402 concludes that the machine on which the operating system 116 is running is in fact a virtual machine. This machine is specifically the virtual machine 112 in FIG. 1. If the machine has more than one network card, this condition is tested for the MAC address of each network card.

In response to determining that the operating system 116 is running on the virtual machine 112 in FIG. 1, the method 400 determines the end-to-end mapping 200 of FIG. 2 (404). This is achieved by performing parts 302, 304, 306, and 308 of the method 300 of FIG. 3, which are now described in more detail. First, the virtual machine 112 is mapped to the virtual machine definition 122 (302). In one embodiment, the MAC address of the virtual machine 112 is used to correlate the virtual machine 112, as reported by the operating system 116, to the virtual machine definition 122 as provided or maintained by the management component 114. If the virtual machine 112 has more than one network card, then the MAC addresses of all its network cards are used for this correlation.

Next, the virtual machine storage device 120 is mapped to the virtual storage device definition 124 of FIG. 1 (304). In one embodiment, a small computer system interface (SCSI) controller number and a SCSI target identifier (ID) of the virtual storage device 120 is used to correlate the storage device 120 as reported by the operating system 116 to the virtual storage device definition 124 as provided by the management component 114. The SCSI controller number is a particular type of storage interface controller number, and the SCSI target ID is a type of storage interface target ID. Other types of storage interface controller numbers and target ID can be employed in embodiments of the invention, besides a SCSI controller number and a SCSI target ID.

SCSI is one type of storage interface. The SCSI controller number, and thus the storage interface controller number, is a number that at least substantially uniquely identifies a controller (as compared to other controllers within a machine and that have the same storage interface) to which a storage device is attached and by which the storage device is controlled. By comparison, the SCSI target ID, and thus the storage interface target ID, is an ID that at least substantially uniquely identifies a storage device (as compared to other storage devices having the same interface). Usage of a SCSI controller number and a SCSI target ID to map the storage device 120 of the virtual machine 112 to the virtual storage device definition 124 is particularly innovative and non-obvious, as is now described in detail.

In a physical machine, the SCSI controller number and/or the SCSI target ID can change when a physical SCSI controller is replaced or moved from one slot to another slot within the physical machine, such as from one peripheral component interconnect (PCI) slot to another PCI slot. The changing, or dynamic, nature of the SCSI controller number and/or the SCSI target ID renders them unlikely candidates to be employed to map a storage device like the storage device 120 of FIG. 1 to a storage device definition like the definition 124 of FIG. 1. This is because if the SCSI controller number and/or the SCSI target ID change, then any mapping that relies on this number and/or this ID is at best temporary, and may change from the time when the mapping is determined to the time when the mapping is actually used (e.g., when the end-to-end mapping 200 of FIG. 2 that relies on this mapping is used).

However, the inventors have novelly determined that in practice, the SCSI controller number and the SCSI target ID are highly unlikely at worst to change in the context of a virtual machine like the virtual machine 112. Therefore, employing the SCSI controller number and the SCSI target ID to map the storage device 120 of the virtual machine 112 to the virtual storage device definition 124 provided by the management component 114 is satisfactory. This insight is non-obvious and innovative because the SCSI controller number and the SCSI target ID are known to change and thus are normally dynamic, such that one of ordinary skill within the art would not ordinarily use this number or ID as a way to determine a mapping. Against this prior art knowledge that teaches away from such usage of the SCSI controller number and the SCSI target ID, the inventors have nevertheless determined that using the SCSI controller number and the SCSI target ID are acceptable to within the context of a virtual machine like the virtual machine 112.

The method 400 next maps the virtual storage device definition 124 to the storage device 108 of the physical computing device 102 in FIG. 1 (306). In one embodiment, an application programming interface (API) of the management component 114 is called to correlate the virtual storage device definition 124 to the physical computing device storage device 108. For example, the VMware® virtual machine software provides such an API that can be called to correlate the virtual storage device definition 124 to the storage device 108.

An API is a language or message format used by an application program, like virtual machine software, to communicate with the operating system or another computer program via a defined communications protocol. An API is implemented by making function calls to the application program in question, which provide the linkage to the subroutine to be executed to return the desired information and/or perform the desired process represented by the API. Thus, an API implies that some program module is available within the application program in question, to perform an operation or return desired information, and that can be called by another computer program.

In other embodiments, an approach other than an API is employed. For example, a command line interface (CLI) command can be called, or the simple network management protocol (SNMP) can be employed. A CLI is an interface by which an application program can be called, in which arguments, such as those referred to as switches, can be specified, in order to return desired information. The SNMP is a network monitoring and control protocol. Information is passed from SNMP agents, and stored in a management information base (MIB), which can then be retrieved.

Storage within the computing device 102 can be provided to the virtual machine 112 in one of two ways. First, file mapping can be employed. File mapping uses a file on the storage device 108 as defined by the file system 106 to act as the virtual storage device 120 (as defined by the virtual storage device definition 124) for the virtual machine 112 (as defined by the virtual machine definition 122). The file has a size equal to the size of the storage device 120 in the virtual machine 112. The API can be called in this case to determine the file on the storage device 108 that corresponds to the virtual storage device 120 of the virtual machine 112.

Second, raw disk mapping can be employed. Raw disk mapping assigns the storage device 108 as a whole as the virtual storage device 120 for the virtual machine 112. Disk-access commands from the virtual machine 112 to the virtual storage device 120 are thus passed directly to the storage device 108. The API can be called in this case to determine that the virtual storage device 120 is mapped in a raw-disk manner to the storage device 108.

The method 400 finally maps the physical computing device storage device 108 to the storage-area or storage-array network (SAN) storage volume 110 of FIG. 1 (308). In one embodiment, another API of the management component 114 is called, and a SAN management component of the SAN 104 is queried via an API of the SAN management component, to correlate the storage device 108 on the physical computing device 102 to the storage volume 110 of the SAN 104. For example, the VMware® virtual machine software provides such an API that can be called to correlate the storage device 108 to the SAN storage volume 110.

In one embodiment, the storage device 108 is identified by a logical unit number (LUN), which is retrieved by calling the API of the management component 114 of FIG. 1, by calling a CLI command of the management component 114, by employing SNMP, or by another approach. Information regarding the SAN storage volume 110 to which this LUN corresponds is then retrieved by querying the SAN management component of the SAN 104, such as via an API of the SAN management component. Such information can include the serial number of the SAN 104, as well as the serial number of the storage volume 110 itself In one embodiment, the SAN management component may be a common information model (CIM) object manager (OM), or CIMOM, which manages the SAN 104 and its constituent storage volumes like the volume 110.

Once the method 400 has determined the end-to-end mapping 200 of FIG. 2 in part 404, the method 400 can effectively manage the virtual machine 112 of FIG. 1 using this end-to-end mapping 200 (406). For example, a network administrator or other user that is contemplating changes to the virtual storage device 120 of the virtual machine 112, the storage device 108 of the computing device 102, or the storage volume 110 of the SAN 104 is able to know a priori that such changes will affect the virtual machine 112. This is because the end-to-end mapping 200 maps the file system 118 of the operating system 116 running on the virtual machine 112, including the virtual storage device 120, on a component-by-component (i.e., on a portion-by-portion) basis to the storage volume 110 of the SAN 104. Thus, contemplating a change to any component or portion of this mapping can be considered in light of that change's effect on the virtual machine 112, due to the knowledge provided by the end-to-end mapping 200.

Exemplary System Implementation

Figure 5:
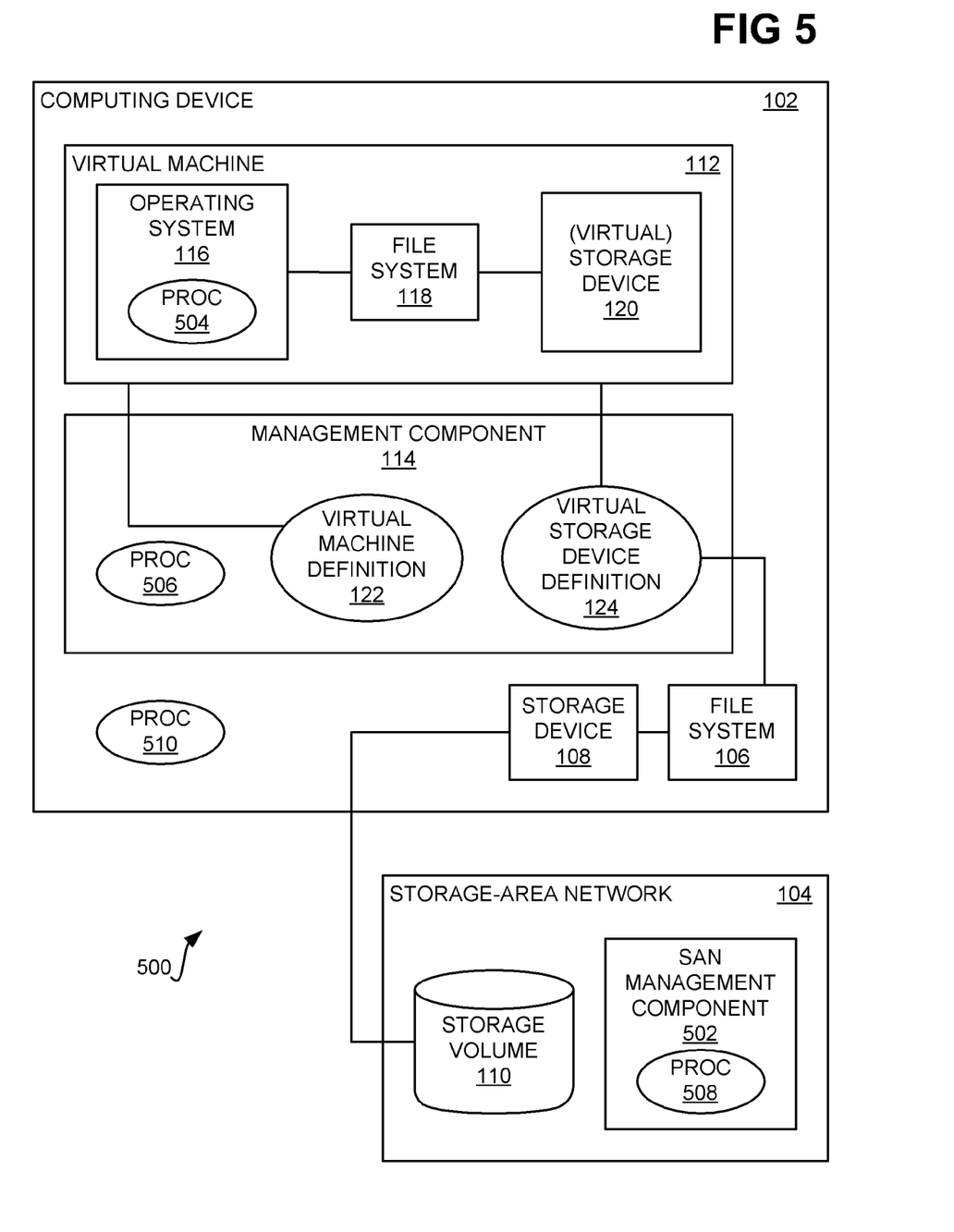
FIG. 5 is a diagram of a system to determine the end-to-end mapping of FIG. 2, and which is consistent with but more detailed than the system of FIG. 1, according to an embodiment of the present invention.

FIG. 5 shows a system 500 that can implement the methods 300 and 400 of FIGS. 3 and 4, respectively, to determine the end-to-end mapping 200 of FIG. 2, according to an embodiment of the invention. The system 500 is consistent with but more detailed than the system 100 of FIG. 1 that has been described. Like-numbered components between the system 500 and the system 100 are therefore not described in detail in relation to FIG. 5 to avoid descriptive redundancy, and are described just as to how the additional components of FIG. 5 operate and are implemented.

In the system 500, the storage-area or storage-array network (SAN) 104 includes a SAN management component 502, as has been described in the previous section of the detailed description. The SAN management component 502 may be a common information model (CIM) object manager (OM), or CIMOM, which manages the SAN 104 and its constituent storage volumes like the volume 110. FIG. 5 also depicts a process 504 running on the operating system 116 of the virtual machine 112, a process 506 running on the management component 114 that manages the virtual machine 112 on the computing device 102, a process 508 running on the SAN management component 502, and a process 510. The processes 504, 506, 508, and 510 are software, but run on hardware, such that they can be considered as being implemented at least partially by or in hardware.

The process 510 in one embodiment runs on the physical computing device 102 outside of the virtual machine 112, and outside the management component 114, such as within an operating system of the computing device 102 that is not part of any virtual machine (not shown in FIG. 5). In another embodiment, the process 510 runs on a computing device other than the physical computing device 102, which may be a server computing device responsible for maintaining all the computing devices, such as the device 102, on which virtual machines are running. In either case, the process 510 may be considered as a process that manages the other processes 504, 506, and 508 to obtain the mappings, correlations, and other information used to determine the end-to-end mapping 200 of FIG. 2.

A process as used in the context of embodiments of the invention can be considered as the actual running of at least a portion of one or more computer programs. For example, if two instances of the same computer program are launched, then two processes are considered to be running. A process may itself have one or more threads, which are sub-processes that may be able to execute in parallel to improve performance of the process in question.

The processes 504, 506, 508, and 510 together constitute a mechanism to determine the end-to-end mapping 200 of FIG. 2 from the file system 118 of the operating system 116 running on the virtual machine 112 to the storage volume 110 of the SAN 104. In one embodiment, the processes 504, 506, 508, and 510 together can be considered as a means for performing this functionality. As such, this mechanism or means performs parts 302, 304, 306, and 308 of the methods 300 and 400 of FIGS. 3 and 4, and part 402 of the method 400, as have been described above. The process 510 interacts with the processes 506, 508, and 510 in order to determine the end-to-end mapping 200. The process 510 may maintain a database, for instance, that stores the information reported by the processes 506, 508, and 510 that represents the end-to-end mapping 200.

The process 504 running on the operating system 116 of the virtual machine 112 provides information to assist performance of parts 302 and 304 of the methods 300 and 400 of FIGS. 3 and 4 and part 402 of the method 400. For example, the process 504 provides information regarding the identity of the virtual machine 112, regarding the identity of the virtual storage device 120, and regarding the file system 118. The process 506 running on the management component 114 provides information to assist performance of parts 302, 304, 306, and 308 of the methods 300 and 400 and part 402 of the method 400. For example, the process 504 provides information regarding the virtual machine definition 122, regarding the virtual storage device definition 124, regarding the identity of the storage device 108, and regarding the file system 106.

The process 508 running on the SAN management component 502 of the SAN 104 provides information to assist performance of part 308 of the methods 300 and 400 of FIGS. 3 and 4. For example, the process 508 provides information regarding the identity of the storage volume 110. The process 510 thus instructs the processes 504, 506, and 508 to collect their relevant information in order to perform the methods 300 and 400 of FIGS. 3 and 4. The process 510 can store this information in a database, can construct the end-to-end mapping 200 of FIG. 2, and can also store the end-to-end mapping 200 in the database. The database is subsequently queryable by during management of the virtual machine 112 in part 406 of the method 400 so that the specifics of the end-to-end mapping 200 can be learned.

Alternative Method and Conclusion

Figure 6:
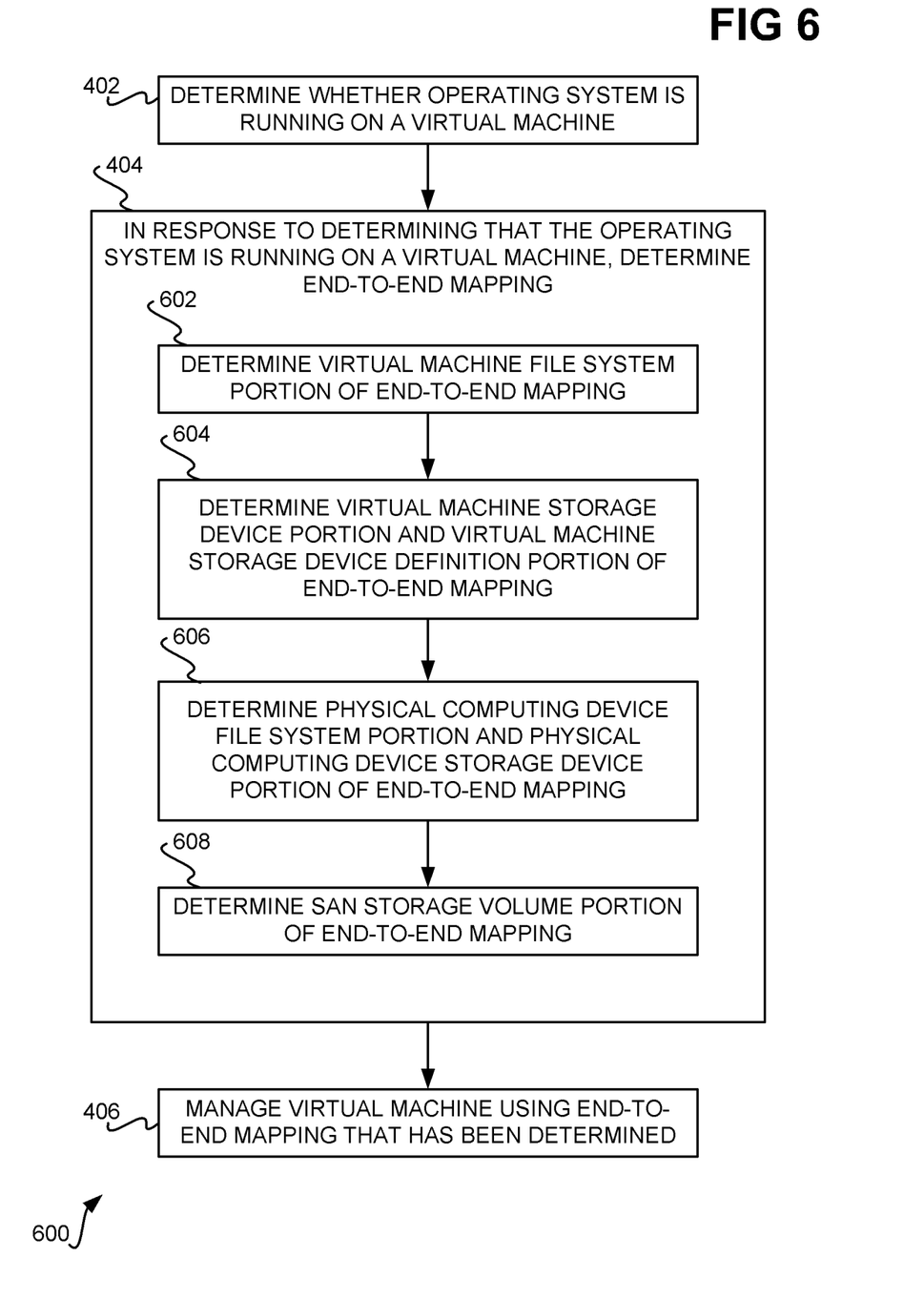
FIG. 6 is a flowchart of a method for determining the end-to-end mapping of FIG. 2, according to another embodiment of the present invention.

In conclusion, FIG. 6 shows a method 600 to determine the end-to-end mapping 200 of FIG. 2, according to another embodiment of the invention. The method 600 approaches the determination of the end-to-end mapping 200 in a different way than the methods 300 and 400 of FIGS. 3 and 4, respectively. The method 600 is described in the context of the end-to-end mapping 200 of FIG. 2, and in the context of the system 100 of FIG. 1.

The method first determines whether the operating system 116 of FIG. 1 is running on a virtual machine (402), as has been described above in relation to the method 400 of FIG. 4. In response to determining that the operating system 116 is running on the virtual machine 112, the method 600 determines the end-to-end mapping 200 of FIG. 2 (404). This is achieved by performing parts 602, 604, 606, and 608.

First, the virtual machine file system portion 202 of the end-to-end mapping 200 of FIG. 2 is determined (602). The virtual machine file system portion 202 includes identification of the file system 118 of the operating system 116 running on the virtual machine 112. Part 602 can be implemented by performing part 302 of the methods 300 and 400 of FIGS. 3 and 4 in one embodiment.

The virtual machine storage device portion 204 and the virtual machine storage device definition portion 206 of the end-to-end mapping 200 of FIG. 2 is determined next (604). The virtual machine storage device portion 204 includes identification of the virtual storage device 120 defined within the file system 118 of the operating system 116 of the virtual machine 112 of FIG. 1. The virtual machine storage device definition portion 206 includes the virtual storage device definition 124. Part 604 can be implemented by performing part 304 of the methods 300 and 400 of FIGS. 3 and 4 in one embodiment.

The physical computing device file system portion 208 and the physical computing device storage device portion 210 of the end-to-end mapping 200 of FIG. 2 is then determined (606). The physical computing device file system portion 208 includes identification of the of the file system 106 of the computing device 102 on which the virtual machine 112 of FIG. 1 is running. The physical computing device storage device portion 210 includes identification of the storage device 108 defined within the file system 106. Part 606 can be implemented by performing part 306 of the methods 300 and 400 of FIGS. 3 and 4 in one embodiment.

The storage-area or storage-array network (SAN) storage volume portion 212 of the end-to-end mapping 200 of FIG. 2 is finally determined (608). The SAN storage volume portion 212 includes identification of the storage volume 110 of the SAN 104 that implements the storage device 108 defined within the file system 106 of the physical computing device 102 of FIG. 1. Part 608 can be implemented by performing part 308 of the methods 300 and 400 of FIGS. 3 and 4 in one embodiment.

The method 600 concludes in one embodiment by managing the virtual machine 112 of FIG. 1 using the end-to-end mapping 200 of FIG. 2 that has been determined (406), as has been described above in relation to the method 400 of FIG. 4. It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method for determining an end-to-end mapping from an operating system running on a virtual machine to a storage volume of a storage-array or storage array network (SAN), comprising:

mapping the virtual machine as reported by the operating system running on the virtual machine to a definition of the virtual machine as provided by and stored at a management component managing the virtual machine, the definition of the virtual machine indicating a type of operating system and a type of file system running on the virtual machine;

mapping a storage device as reported by the operating system running on the virtual machine to a definition of a virtual storage device as provided by and stored at the management component managing the virtual machine, by using a storage interface controller number and a storage interface target identifier (ID) of the virtual storage device to correlate the storage device as reported by the operating system to the definition of the virtual storage device as provided by the management component, the definition of the virtual storage device indicating a particular storage device that implements the virtual storage device via a particular file system and indicating a particular storage volume that implements the particular storage device;

mapping the definition of the virtual storage device to a storage device on a physical computing device on which the management component and the virtual machine are running; and, mapping the storage device on the physical computing device to the storage volume of the SAN, wherein the storage interface controller number and the storage interface ID are normally dynamic.

2. The method of claim 1, wherein the storage interface controller number is a small computer system storage interface (SCSI) number, and the storage interface target ID is a SCSI target ID.

3. The method of claim 1, wherein the end-to-end mapping comprises, in order: a virtual machine file system portion linked to a virtual machine storage device portion, the virtual machine storage device portion linked to a virtual machine storage device definition portion, the virtual machine storage device portion linked to a physical computing device file system portion, the physical computing device file system portion linked to a physical computing device storage device portion, the physical computing device storage device portion linked to a SAN storage volume portion, and the SAN storage volume portion.

4. The method of claim 1, wherein mapping the virtual machine as reported by the operating system to the definition of the virtual machine as reported by the management component comprises using a media-access control (MAC) address of the virtual machine to correlate the virtual machine as reported by the operating system to the definition of the virtual machine as provided by the management component.

5. The method of claim 1, wherein mapping the virtual machine as reported by the operating system to the definition of the virtual machine as reported by the management component provides a virtual machine file system portion of the end-to-end mapping.

6. The method of claim 1, wherein mapping the storage device as reported by the operating system running on the virtual machine to the definition of the virtual storage device as provided by the management component provides a virtual machine storage device portion of the end-to-end mapping and a virtual machine storage device definition portion of the end-to-end mapping.

7. The method of claim 1, wherein mapping the definition of the virtual storage device to the storage device on the physical computing device comprises one of:
   calling an application programming interface (API) of the management component to correlate the definition of the virtual storage device to the storage device on the physical computing device;
   calling a command line interface (CLI) command to correlate the definition of the virtual storage device to the storage device on the physical computing device; and,
   employing a simple network management protocol (SNMP) to correlate the definition of the virtual storage device to the storage device on the physical computing device.

8. The method of claim 1, wherein mapping the definition of the virtual storage device to the storage device on the physical computing device provides a physical computing device file system portion of the end-to-end mapping and a physical computing device storage device portion of the end-to-end mapping.

9. The method of claim 1, wherein mapping the storage device on the physical computing device to the storage volume of the SAN comprises:
   one of:
      calling an application programming interface (API) of the management component;
      calling a command line interface (CLI) command of the management component;
      employing a simple network management protocol (SNMP); and,
   querying a SAN management component to correlate the storage device on the physical computing device to the storage volume of the SAN.

10. The method of claim 1, wherein mapping the storage device on the physical computing device to the storage volume of the SAN provides a SAN storage volume portion of the end-to-end mapping.

11. The method of claim 1, further comprising managing the virtual machine using the end-to-end mapping from the operating system running on the virtual machine to the storage volume of the SAN that has been determined.

12. The method of claim 1, further comprising determining whether the operating system is running on the virtual machine,
   wherein in response to determining that the operating system is running on the virtual machine, the method determines the end-to-end mapping from the operating system running on the virtual machine to the storage volume of the SAN.

13. The method of claim 12, wherein determining whether the operating system is running on the virtual machine comprises:
   determining a media-access control (MAC) address of a machine on which the operating system is running;
   determining whether the MAC address of the machine on which the operating system is running falls within a range of MAC addresses assigned by the management component to virtual machines; and,
   in response to determining that the MAC address of the machine on which the operating system is running falls within the range of MAC addresses assigned by the management component to virtual machines, concluding that the operating system is running on the virtual machine.

14. A method for determining an end-to-end mapping from a file system of an operating system running on a virtual machine to a storage volume of a storage-array or storage-area network (SAN), comprising:
   determining a virtual machine file system portion of the end-to-end mapping, the virtual machine file system portion comprising identification of the file system of the operating system running on the virtual machine;
   determining a virtual machine storage device portion of the end-to-end mapping and a virtual machine storage device definition portion of the end-to-end mapping to provide the virtual machine storage device portion and the virtual machine storage definition portion of the end-to-end mapping, the virtual machine storage device portion comprising identification of a virtual machine storage device defined within the file system of the operating system running on the virtual machine, the virtual machine storage device definition portion comprising a definition of the virtual machine storage device as provided by and storage at a management component managing the virtual machine, the definition of the virtual machine storage device indicating a particular storage device that implements the virtual machine storage device via a particular file system and indicating a particular storage volume that implements the particular storage device;
   determining a physical computing device file system portion of the end-to-end mapping and a physical computing device storage device portion of the end-to-end mapping to provide the physical computing device file system portion and the physical computing device storage portion of the end-to-end mapping, the physical computing device file system portion comprising a file system of a physical computing device on which the virtual machine is running, the physical computing device storage device portion comprising identification of a storage device defined within the file system of the physical computing device on which the virtual machine is running; and,
   determining a SAN storage volume portion of the end-to-end mapping to provide the SAN storage volume portion of the end-to-end mapping, the SAN storage volume portion comprising identification of a storage volume of a SAN that implements the storage device defined within the file system of the physical computing device on which the virtual machine is running,
   wherein determining the virtual machine storage device portion and the virtual machine storage device definition portion of the end-to-end mapping comprises mapping a storage device as reported by the operating system running on the virtual machine to a definition of a virtual storage device as provided by and stored at the management component, the definition of the virtual storage device indicating a particular storage device that implements the virtual storage device via a particular file system and indicating a particular storage volume that implements the particular storage device, and
   wherein mapping the storage device as reported by the operating system running on the virtual machine to the definition of the virtual storage device as provided by the management component comprises using a storage interface controller number and a storage interface target identifier (ID) of the virtual storage device to correlate the storage device as reported by the operating system to the definition of the virtual storage device as provided by the management component, wherein the storage interface controller number and the storage interface ID are normally dynamic.

15. The method of claim 14, wherein the storage interface controller number is a small computer system storage interface (SCSI) number, and the storage interface target ID is a SCSI target ID.

16. The method of claim 14, wherein the end-to-end mapping comprises, in order: the virtual machine file system portion linked to the virtual machine storage device portion, the virtual machine storage device portion linked to the virtual machine storage device definition portion, the virtual machine storage device portion linked to the physical computing device file system portion, the physical computing device file system portion linked to the physical computing device storage device portion, the physical computing device storage device portion linked to the SAN storage volume portion, and the SAN storage volume portion.

17. The method of claim 14, wherein determining the virtual machine file system portion of the end-to-end mapping comprises mapping the virtual machine as reported by the operating system to a definition of the virtual machine as provided by the management component.

18. The method of claim 17, wherein mapping the virtual machine as reported by the operating system to the definition of the virtual machine as reported by the management component comprises using a media-access control (MAC) address of the virtual machine to correlate the virtual machine as reported by the operating system to the definition of the virtual machine as provided by the management component.

19. The method of claim 14, wherein determining the physical computing device file system portion and the physical computing device storage device portion of the end-to-end mapping comprises mapping a definition of the virtual storage device to a storage device on the physical computing device.

20. The method of claim 19, wherein mapping the definition of the virtual storage device to the storage device on the physical computing device comprises one of:
calling an application programming interface (API) of the management component to correlate the definition of the virtual storage device to the storage device on the physical computing device;
calling a command line interface (CLI) command to correlate the definition of the virtual storage device to the storage device on the physical computing device; and,
employing a simple network management protocol (SNMP) to correlate the definition of the virtual storage device to the storage device on the physical computing device.

21. The method of claim 14, wherein determining the SAN storage volume portion of the end-to-end mapping comprises mapping the storage device on the physical computing device to the storage volume of the SAN.

22. The method of claim 21, wherein mapping the storage device on the physical computing device to the storage volume of the SAN comprises:
one of:
calling an application programming interface (API) of the management component;
calling a command line interface (CLI) command of the management component;
employing a simple network management protocol (SNMP); and,
querying a SAN management component to correlate the storage device on the physical computing device to the storage volume of the SAN.

23. The method of claim 14, further comprising managing the virtual machine using the end-to-end mapping from the file system of the operating system running on the virtual machine to the storage volume of the SAN that has been determined.

24. The method of claim 14, further comprising determining whether the operating system is running on the virtual machine,
wherein in response to determining that the operating system is running on the virtual machine, the method determines the end-to-end mapping from the file system of the operating system running on the virtual machine to the storage volume of the SAN.

25. A computer-readable medium having one or more computer programs stored thereon for execution by one or more processors, wherein execution of the computer programs by the processors results in performance of a method for determining an end-to-end mapping from an operating system running on a virtual machine to a storage volume of a storage-array or storage-area network (SAN), comprising:
mapping the virtual machine as reported by an operating system running on the virtual machine to a definition of the virtual machine as provided by and stored at a management component managing the virtual machine, the definition of the virtual machine indicating a type of operating system and a type of file system running on the virtual machine;
mapping a storage device as reported by the operating system running on the virtual machine to a definition of a virtual storage device as provided by and stored at the management component managing the virtual machine, by using a storage interface controller number and a storage interface target identifier (ID) of the virtual storage device to correlate the storage device as reported by the operating system to the definition of the virtual storage device as provided by the management component, the definition of the virtual storage device indicating a particular storage device that implements the virtual storage device via a particular file system and indicating a particular storage volume that implements the particular storage device;
mapping the definition of the virtual storage device to a storage device on a physical computing device on which the management component and the virtual machine are running; and,
mapping the storage device on the physical computing device to the storage volume of the SAN,
wherein the storage interface controller number and the storage interface ID are normally dynamic.

26. The computer-readable medium of claim 25, wherein the end-to-end mapping comprises, in order: a virtual machine file system portion linked to a virtual machine storage device portion, the virtual machine storage device portion linked to a virtual machine storage device definition portion, the virtual machine storage device portion linked to a physical computing device file system portion, the physical computing device file system portion linked to a physical computing device storage device portion, the physical computing device storage device portion linked to a SAN storage volume portion, and the SAN storage volume portion.

27. The computer-readable medium of claim 25, wherein the method further comprises managing the virtual machine using the end-to-end mapping from the operating system running on the virtual machine to the storage volume of the SAN that has been determined.

28. A system comprising:
a physical computing device having a file system, the file system defining a storage device;
a storage-area or storage-array network (SAN) having a SAN storage volume to implement the storage device defined by the file system of the physical computing device;
a virtual machine to run on the physical computing device, the virtual machine having an operating system and a virtual machine file system, the virtual machine file system having a virtual machine storage device, the virtual machine storage device implemented by the storage device defined by the file system of the physical computing device;
a management component to run on the physical computing device to manage the virtual machine, the management component to maintain, store, and provide a virtual machine storage device definition of the virtual machine storage device, the virtual machine storage device definition indicating a particular storage device that implements the virtual machine storage device via a particular file system and indicating a particular storage volume that implements the particular storage device; and,
a mechanism to determine an end-to-end mapping from the file system of the operating system running on the virtual machine to the SAN storage volume of the SAN, by:
mapping the virtual machine as reported by the operating system running on the virtual machine to the definition of the virtual machine as provided by and stored at the management component, the definition of the virtual machine indicating a type of operating system and a type of file system running on the virtual machine;
mapping a storage device as reported by the operating system running on the virtual machine to the virtual machine storage device definition, by using a storage interface controller number and a storage interface target identifier (ID) of the virtual storage device to correlate the storage device as reported by the operating system to the definition of the virtual storage device as provided by the management component the definition of the virtual storage device indicating a particular storage device that implements the virtual storage device via a particular file system and indicating a particular storage volume that implements the particular storage device;
mapping the virtual machine storage device definition to the storage device; and
mapping the storage device to the SAN storage volume,
wherein the storage interface controller number and the storage interface ID are normally dynamic.

29. The system of claim 28, wherein the end-to-end mapping comprises, in order: a virtual machine file system portion linked to a virtual machine storage device portion, the virtual machine storage device portion linked to a virtual machine storage device definition portion, the virtual machine storage device portion linked to a physical computing device file system portion, the physical computing device file system portion linked to a physical computing device storage device portion, the physical computing device storage device portion linked to a SAN storage volume portion, and the SAN storage volume portion.

30. The system of claim 28, wherein the mechanism comprises:

a first process to run on the operating system of the virtual machine;
a second process to run on the physical computing device outside of the virtual machine;
a third process of a SAN management component to run on the SAN; and,
a fourth process of the management component to run on the physical computing device.

31. The system of claim 28, wherein the mechanism is to:
map the virtual machine to a definition of the virtual machine provided by the management component;
map the virtual machine storage device to the virtual machine storage device definition;
map the virtual machine storage device definition to the storage device defined by the file system of the physical computing device; and,
map the storage device defined by the file system of the physical computing device to the SAN storage volume.

32. The system of claim 31, wherein the mechanism is to map the virtual machine storage device to the virtual machine storage device definition by using a small computer system interface (SCSI) controller number and a SCSI target identifier (ID) of the virtual machine storage device to correlate the virtual machine storage device to the virtual machine storage device definition.

33. A system comprising:
a physical computing device having a file system, the file system defining a storage device;
a storage-area or storage-array network (SAN) having a SAN storage volume to implement the storage device defined by the file system of the physical computing device;
a virtual machine to run on the physical computing device, the virtual machine having an operating system and a virtual machine file system, the virtual machine file system having a virtual machine storage device, the virtual machine storage device implemented by the storage device defined by the file system of the physical computing device;
a management component to run on the physical computing device to manage the virtual machine, the management component to maintain, store, and provide a virtual machine storage device definition of the virtual machine storage device, the virtual machine storage device definition indicating a particular storage device that implements the virtual machine storage device via a particular file system and indicating a particular storage volume that implements the particular storage device; and,
means for determining an end-to-end mapping from the file system of the operating system running on the virtual machine to the SAN storage volume of the SAN, by:
mapping the virtual machine as reported by the operating system running on the virtual machine to the definition of the virtual machine as provided by and stored at the management component, the definition of the virtual machine indicating a type of operating system and a type of file system running on the virtual machine;
mapping a storage device as reported by the operating system running on the virtual machine to the virtual machine storage device definition, by using a storage interface controller number and a storage interface target identifier (ID) of the virtual storage device to correlate the storage device as reported by the operating system to the definition of the virtual storage device as provided by the management component the definition of the virtual storage device indicating a particular storage device that implements the virtual storage device via a particular file system and indicating a particular storage volume that implements the particular storage device;
mapping the virtual machine storage device definition to the storage device; and
mapping the storage device to the SAN storage volume, wherein the storage interface controller number and the storage interface ID are normally dynamic.

34. The system of claim 33, wherein the means is further for mapping the virtual machine storage device to the virtual machine storage device definition by using a small computer system interface (SCSI) controller number and a SCSI target identifier (ID) of the virtual machine storage device to correlate the virtual machine storage device to the virtual machine storage device definition.

* * * * *

UNITED STATES PATENT AND TRADEMARK OFFICE
CERTIFICATE OF CORRECTION

| | | |
|---|---|---|
| PATENT NO. | : 8,799,894 B2 | |
| APPLICATION NO. | : 12/428328 | |
| DATED | : August 5, 2014 | |
| INVENTOR(S) | : Ajay Lunawat et al. | |

It is certified that error appears in the above-identified patent and that said Letters Patent is hereby corrected as shown below:

On the title page, item (75), in the inventors, lines 3-4, Viroel Ciurea should be:

-- Ciurea Stelian-Viorel --

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,799,894 B2
APPLICATION NO. : 12/428328
DATED : August 5, 2014
INVENTOR(S) : Lunawat et al.

Page 1 of 1

It is certified that error appears in the above-identified patent and that said Letters Patent is hereby corrected as shown below:

Title Page,

Item (75), Inventor, "Ciurea Stelian Viorel" (as corrected to read in the Certificate of Correction issued November 11, 2014) is deleted and patent is returned to its original state with inventor name in patent to read -- Viorel Ciurea --.

Signed and Sealed this
Twentieth Day of January, 2015

Michelle K. Lee
*Deputy Director of the United States Patent and Trademark Office*